Patented June 20, 1950

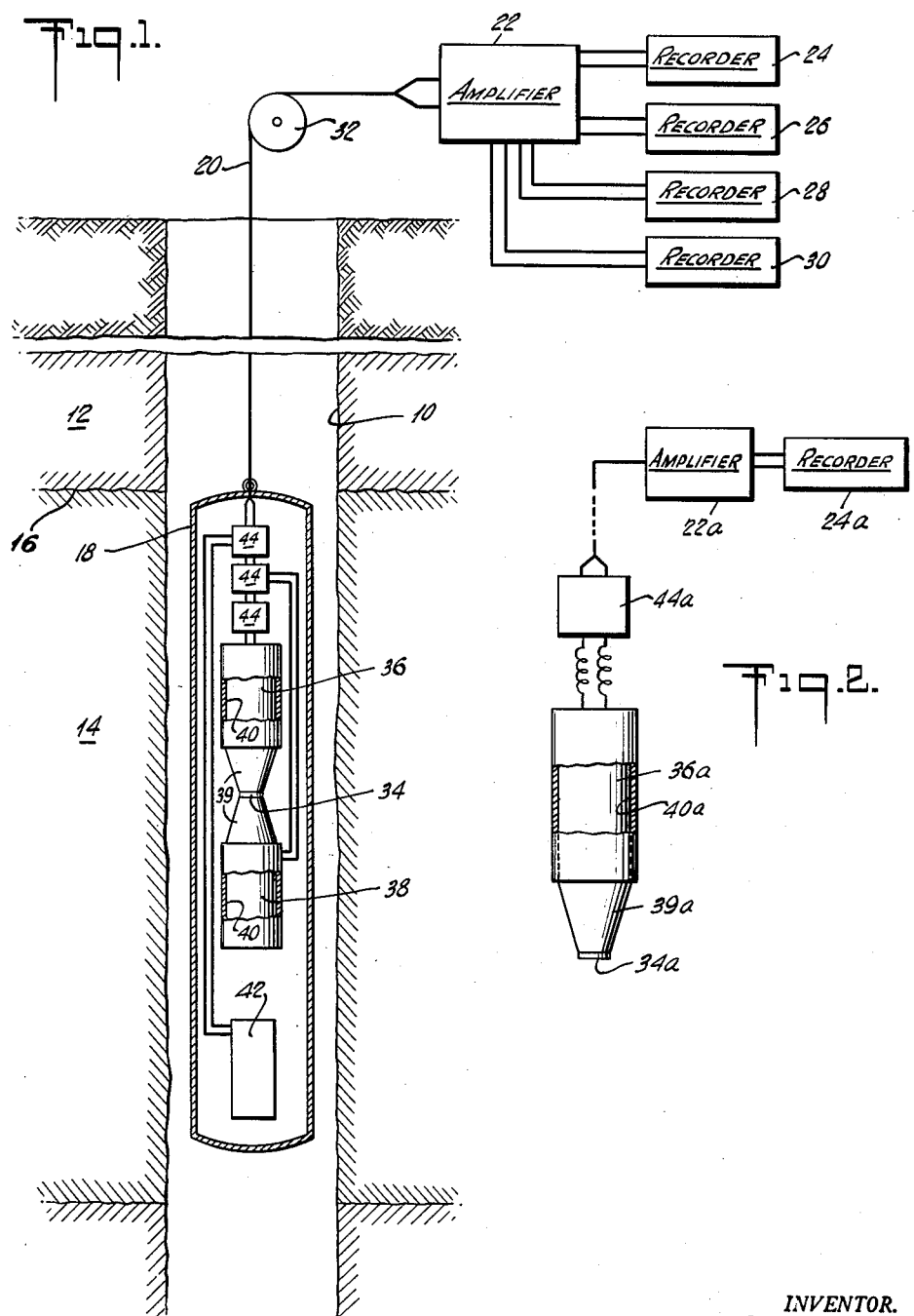

2,512,020

UNITED STATES PATENT OFFICE 2,512,020

RADIOLOGICAL WELL LOGGING

Gerhard Herzog, Houston, Tex., assignor to The Texas Company, New York, N. Y., a corporation of Delaware Application March 21, 1945, Serial No. 583,907

10 Claims. (Cl. 250—83.6)

This invention relates to radiological well logging and more particularly to a method and an apparatus for determining the nature and location of the formations traversed by a bore hole by passing a source of neutrons through the bore hole while measuring the intensity of the gamma rays liberated in the formations due to the neutron bombardment and some of which liberated gamma rays enter the bore hole in the vicinity of the neutron source.

The principal object of the invention is to increase the number of liberated gamma rays detected while minimizing the effect on the detector of direct gamma radiation from the source of neutrons and also of gamma rays from the source scattered in and returned to the detector from the surrounding formations.

In the so-called neutron-gamma ray logging a neutron source is passed through the bore hole and a gamma ray detector is mounted in the vicinity of the source so that some of the gamma rays liberated in the formations by the neutron bombardment will be registered by the detector and their intensity recorded and correlated with depth in the hole. It is obvious that in this type of logging the detector should measure only the gamma rays induced or liberated in the formation to the exclusion of gamma rays originating in the source and passing toward the detector and gamma rays from the source which are scattered in the surrounding formations and returned to the detector.

In a neutron source such as a mixture of radium and beryllium gamma rays are of course emitted due to the presence of the radium. In order to prevent the direct gamma radiation from the source from reaching the detector it is customary to place between the source and the detector a layer of some material, such as lead, capable of absorbing the gamma radiation. With increased thickness of the absorbing or shielding layer the distance between the source and the detector naturally increases and since the intensity at the detector follows the inverse square law with regard to the sum of the length of the path of the primary beam and the length of the path of the gamma rays liberated in the formations by the neutron bombardment, this increase in distance reduces appreciably the intensity of the liberated gamma rays which fall onto the detector. It is advisable therefore to use as a shielding medium a material of high density such as tungsten or gold. A tungsten alloy is obtainable in the form of "Mallory 1000" which contains about 99% tungsten and which has a density of 19 grams/cm.$^3$ as compared to lead which has a density of 11.3 grams/cm.$^3$. A tungsten absorber or shield can therefore be made .6 times as thick as a lead absorber with equal absorption power.

The length of the gamma ray detector is limited because the end which is farthest from the source will be struck by fewer liberated gamma rays than the end close to the source. An increase in the detector length beyond certain limits will actually decrease the quality of the log because this part of the detector will register mainly gamma rays which pass from the source through the absorber directly to the detector, those gamma rays from the source scattered in the surrounding formations and also gamma rays due to the natural radioactivity of the formations.

For high quality logs which are taken at high logging speeds it is necessary to have a high intensity due to the liberated gamma rays. One way of accomplishing this would be to use a very large source of neutrons but such a source would in all probability be prohibitively expensive. One feature of this invention therefore resides in using two vertically and symmetrically disposed gamma ray detectors with the neutron source between them and with absorption shields or layers between the source and the near end of each detector. In this manner use is made of the neutron emission passing from the source in both upwardly and downwardly inclined directions and a doubling of the detector output is thus obtained. With such an increase in the detector output the logging speed can either be doubled for the same degree of accuracy or the logging speed may remain as usual with a higher degree of accuracy in the resulting log.

It is known that scattered gamma rays have a smaller penetrating power, i. e., a lower energy than induced or liberated gamma rays and another feature of the invention resides in selectively removing the unwanted scattered gamma rays passing toward a detector by absorbing them with a layer of absorbing material surrounding the detector. It has been found that such a layer may comprise, for instance, a sleeve of lead $\frac{3}{8}$ inches thick or a sleeve of tungsten substantially $\frac{3}{16}$ inches in thickness.

Thus, in accordance with one embodiment of the invention a neutron source is separated from a gamma ray detector by a layer or block of a gamma ray absorptive material of high density and the detector is also surrounded on its exposed sides with a layer of such a material, preferably tungsten, sufficiently thick to absorb the low energy gamma ray scattered from the formations, but sufficiently thin to permit passage to the detector of the gamma rays liberated in the formations due to the neutron bombardment. In another embodiment a neutron source is disposed symmetrically between a pair of vertically separated gamma ray detectors with absorption shields between the source and the near end of each detector, the result being to substantially double the number of the detected, liberated gamma rays and to minimize the detected, scattered gamma rays. By recording separately, but simultaneously the outputs of the detectors the location of boundaries between adjacent formations can be more accurately determined. It is also contemplated that an additional gamma ray detector can be disposed in the instrument housing at such a distance from the other detectors that it will not be affected by direct gamma rays or by the liberated or the scattered gamma rays and the response of this additional detector will provide an indication of the natural gamma radioactivity of the formations. This can then be subtracted from the response of the other two detectors so that a record can be obtained showing only the variations in the amount of the liberated gamma rays as the instrument passes through the hole.

While any suitable instruments can be used as the gamma ray detectors such as, for instance, ionization chambers, it is preferred to use counters of the type disclosed in the U. S. Letters Patent of D. G. C. Hare No. 2,397,071, granted March 19, 1946, as these instruments have proven to be many times more efficient than the other known types of gamma radiation detectors.

For a better understanding of the invention reference may be had to the accompanying drawing in which Figure 1 is a vertical sectional elevation through a bore hole containing a well logging instrument embodying the features of the invention and Figure 2 is a vertical elevation of an embodiment in which but one detector is used.

Referring to the drawing a bore hole 10 is shown as traversing several subsurface formations such as those indicated at 12 and 14, the two formations 12 and 14 having a common boundary 16. Within the hole 10 is a sealed housing 18, which will hereinafter be referred to as the "logging instrument," this housing containing the neutron source, the gamma ray detectors, the preamplifiers and the like. The logging instrument is suspended in the hole and is moved upwardly and downwardly by means of a cable 20 containing one or more electrical conductors which at their lower end are connected to the instrument parts within the housing and at their upper end to a suitable amplifier and discriminator 22, the function of which will be described hereinafter. Four recorders 24, 26, 28 and 30 are shown as receiving the output of this device 22 and serve to make permanent records or curves of the hole being logged. The cable 20 passes over or around a suitable measuring device 32 by means of which the depth of the instrument in the hole can be continuously indicated and correlated with the record of the outputs of the gamma ray detectors.

Within the housing 18 is a source 34 of neutrons which may comprise a mixture of radium and beryllium and from which neutrons pass outwardly to penetrate the formations surrounding the hole wherein gamma rays are liberated, some of which return to a pair of gamma ray detectors or counters 36 and 38 disposed vertically and at opposite sides of the source. Between the source 34 and the inner end of each detector is a layer or block 39 of a material of high density such as lead, gold or tungsten, preferably tungsten or a tungsten alloy containing mainly tungsten, and which serves to absorb and prevent gamma rays from the source 34 striking the detectors 36 and 38. As has been stated hereinbefore, if tungsten is used as the absorbing material the layers 39 need be little more than half as thick as when lead is used, and the intensity at the detectors, i.e., the detector response will be greater because of the shorter length of the combined paths of the primary neutron beam and the liberated gamma ray beam.

Surrounding the vertical sides of each detector is a sleeve or cylinder 40 again of a material such as lead, gold or tungsten, preferably the latter, of sufficient thickness to absorb gamma rays which originate in the source 34 and which are scattered back from the formations toward the detectors. These sleeves 40 are, however, sufficiently thin to permit the passage to the detectors of the higher energy gamma rays liberated in the formations due to the neutron bombardment. With the provision of the two detectors 36 and 38 disposed at opposite sides of the source 34 the combined response is of course double that which would be obtained by one detector alone, and if a single longer detector were used in an effort to increase the response, the portion of the detector farthest from the source would be of little use for reasons which have been pointed out. In practice it has been found that from 12 to 15 inches is a satisfactory length for each detector.

Also disposed within the housing 18 and separated from the other detectors is a third gamma ray detector or counter 42 which has no absorbing shield around it. This detector is responsive to, and its output will indicate variations in, the amount or intensity of gamma rays originating in and passing into the hole 10 from the surrounding formations as the instrument traverses these formations.

Each of the detectors 36, 38 and 42 is preferably connected electrically to a separate preamplifier 44 and the output of each preamplifier passes upwardly through a conductor in the cable 20 to the amplifier 22 at the surface. In this type of signal transmission the cable 20 will of course be made up of several electrical conductors in order that the signal output of each preamplifier can be conducted separately to the surface and in order that the necessary electrical power can be conducted downwardly from a supply, not shown, at the surface to the instrument in the bore hole. It may be preferred, however, to use cable which contains a single insulated conductor surrounded by a conducting sheath. The signals from the three preamplifiers can be transmitted through such a cable and then separated at the surface in various ways. For example, modulated carrier waves of various frequencies may be used together with proper filtering circuits or individual pulses may be transmitted which differ in size or polarity and or both which can be separated or "unscrambled" at the surface by proper filtering means.

Regardless of which system of signal transmission is utilized it is understood that the amplifier 22 will pass on to the series of recorders 24—30 signals corresponding to the response of the individual radiation detectors 36, 38 and 42 or signals representing combinations of these detector responses or outputs. Thus the device 24 may record the output of the detector 36; the device 26 the output of the detector 38; the device 28 the instantaneous sum of the outputs of both detectors 36 and 38 and the device 30 the output of the detector 42. By recording simultaneously by means of the recorder 28 the sum of the outputs of the two detectors 36 and 38 the number of liberated gamma rays recorded will be substantially double that which would be supplied by a single detector. By utilizing the devices 24 and 26 to record the separate outputs of the detectors 36 and 38 a more accurate measurement may be made of the location or depth of the boundaries between the earth formations such as the boundary 16 between the formations 12 and 14. This is possible, of course, because when the source 34 is exactly opposite the boundary 16 the upper detector 38 will record gamma rays liberated in the formation 12 and the lower detector 38 will record gamma rays liberated in the formation 14.

The detectors 36 and 38 will also respond to gamma rays which originate due to the natural radioactivity of the formations. The detector 42 will respond only to this natural gamma radiation and by subtracting the record of the response of the detector 42 from the record of the response of one of the detectors 36 or 38 or from half the sum of the responses of both detectors, assuming all of the detectors 36, 38 and 42 are of equal length, the effect of the natural gamma radiation from the formations can be eliminated. Since the shields 40 absorb the gamma rays scattered in the formations and returned to the detectors and since the shields 39 absorb the primary gamma rays passing from the source 34 toward the detectors 36 and 38, the latter two detectors will provide the desired record which will be limited to the gamma rays liberated in the formations due to the bombardment by the neutrons and the gamma rays due to the natural radioactivity of the formations.

In Figure 2 is shown somewhat diagrammatically another embodiment of the invention in which a source 34a of neutrons is separated by means of an absorber 39a from a gamma ray detector 36a the output of which passes to a pre-amplifier 44a and then to an amplifier 22a. The output of the amplifier 22a is led, in turn, to a recorder 24a. The detector 36a is surrounded at its sides by a sleeve 40a of a gamma ray absorptive material of sufficient thickness to absorb gamma rays originating in the source 34a and scattered back toward the detector by any surrounding medium. The absorber 39a is formed of a material of high density such as lead, gold, tungsten or tungsten alloy and it is preferred that tungsten or an alloy containing mainly tungsten be used since, as has been pointed out hereinbefore, in the case where tungsten is used the distance between the source 34a and the detector 36a can be substantially half as long as is the case where lead is used as the absorbing medium, and the resulting intensity measured by the detector will be considerably greater due to the shorter length of the path of the primary neutron beam and the path of the beam of the gamma rays liberated in the surrounding medium by the neutron bombardment and passing toward the detector. It is also preferable, although not essential, that the sleeve 40a also be formed of tungsten since it need therefore be only about half as thick as though it were formed of lead.

When the elements shown in Figure 2 are used in connection with the logging of a bore hole as has been described with reference to Figure 1 the sleeve 40a will absorb the gamma rays originating in the source of 34a and scattered back toward the detector 36a and a log will thus be obtained in which the effect of these scattered gamma rays will be eliminated. As has been pointed out above, by utilizing a material of high density such as tungsten as the absorber 39a for the direct primary gamma radiation, the detector 36a can be disposed fairly close to the source 34a and the response of the detector to the liberated gamma rays will be relatively great as compared to the case where the detector must be separated a considerable distance from the source to allow room for absorbing material sufficiently thick to eliminate the primary gamma rays passing directly toward the detector.

It is also contemplated that the apparatus shown in Figure 2 may be used in connection with the measurement of radiation other than that passing toward the detector from formations surrounding a bore hole. It may be desired, for instance, to measure the strength of a source of gamma radiation such as radium. Let us assume that 34a is a source of gamma radiation which is quite weak and that it is desired to measure only the gamma rays of high energy from that source. If a material such as lead having a density considerably lower than tungsten were used as the absorber 39a for screening out or shielding the detector 36a from the low energy rays originating in the source 34a, such a large amount of the lead might have to be used that the source would be separated so far from the detector that the latter would be substantially incapable of measuring the desired high energy gamma radiation from the source. However, if a material such as tungsten, having a relatively high density is used as the absorber 39a only about half as much is required and therefore the distance between the source 34a and the detector 36a can be made much shorter. The tungsten absorber will shield the detector from the low energy primary gamma rays just as would the larger amount of lead but since the distance between the source and the detector will be only about half as long when tungsten is used as the absorber, the detector will respond to the high energy gamma rays which it is desired to measure.

When measuring primary radiation from a source, as described in the preceding paragraph, it is also advisable, although not absolutely essential, to use the side shield of sleeve 40a since this member will shield the detector from gamma rays scattered in surrounding media.

Obviously many modifications and variations of the invention, as hereinbefore set forth, may be made without departing from the spirit and scope thereof, and therefore only such limitations should be imposed as are indicated in the appended claims.

I claim:

1. A method of logging a bore hole which comprises passing through said hole a source of neutrons whereby neutrons in penetrating the walls of the hole liberate gamma rays, and simultaneously measuring the intensity of said liberated gamma rays which pass from the hole walls into the hole to zones spaced equidistantly from and at opposite sides of said source.

2. A method of logging a bore hole which comprises passing through said hole a source of neutrons whereby neutrons in penetrating the walls of the hole liberate gamma rays, and simultaneously measuring the intensity of said liberated gamma rays which pass from the hole walls into the hole both above and below said source.

3. A method of determining the nature and location of underground formations traversed by a bore hole which comprises passing through said hole a source of neutrons from which neutrons pass outwardly into said formations to liberate gamma rays, simultaneously detecting those liberated gamma rays penetrating the bore hole in proximity to and both above and below said source, recording the intensity of said detected gamma rays and correlating said intensity measurements with the depth of the source in the hole.

4. A method of determining the nature and location of underground formations traversed by a bore hole which comprises passing through said hole a source of neutrons from which neutrons pass outwardly to bombard said formations so as to liberate gamma rays, some of which enter said hole near said source, and simultaneously separately determining the intensity of the liberated gamma rays reaching the hole above and below the source.

5. A method of determining the nature and location of underground formations traversed by a bore hole which comprises passing through said hole a source of neutrons from which neutrons pass outwardly into said formations to liberate gamma rays, some of which enter said hole near said source, and simultaneously separately determining the intensity of the liberated gamma rays reaching a pair of gamma ray detectors disposed equidistantly from and at opposite vertical sides of said source.

6. A method of determining the nature and location of underground formations traversed by a bore hole which comprises passing through said hole a source of neutrons from which neutrons pass outwardly into said formations to liberate gamma rays, some of said gamma rays entering said hole near said source, simultaneously and separately determining the intensity of the liberated gamma rays reaching zones located above and below said source and measuring the sum of the liberated gamma rays reaching said zones.

7. A method of determining the nature and location of underground formations traversed by a bore hole which comprises passing through said hole a source of neutrons from which neutrons pass outwardly into said formations to liberate gamma rays, some of which enter said hole near said source, simultaneously separately determining the intensity of the liberated gamma rays reaching zones spaced equidistantly above and below said source while excluding from said zones gamma rays originating in said source.

8. A method of determining the nature and location of underground formations traversed by a bore hole which comprises passing through said hole a source of neutrons from which neutrons pass outwardly to bombard said formations so as to liberate gamma rays therefrom, some of said liberated gamma rays entering said hole near said source, measuring the sum of the intensities of the liberated gamma rays reaching a pair of zones spaced equidistantly above and below the source, simultaneously therewith measuring the intensity of the liberated gamma rays reaching each of said zones separately while shielding said zones from gamma rays originating in said source and passing directly toward said zones and gamma rays scattered from said source in the surrounding formations, and simultaneously measuring the intensity of gamma rays reaching the hole due to the natural radioactivity of the surrounding formations.

9. A device for logging a bore hole comprising a housing adapted to be lowered and raised through said hole, a pair of gamma ray detectors disposed vertically in said housing, a source of neutrons mounted substantially midway between said detectors and capable of bombarding the hole walls to liberate gamma rays therefrom, means between said source and said detectors for shielding said detectors from direct gamma radiation from said source, and means disposed between each detector and the hole walls for absorbing the gamma rays originating in said source and scattered in the walls of the bore hole.

10. A device for determining the nature and location of the formations traversed by a bore hole comprising a housing, means for lowering and raising said housing through said hole, a pair of gamma ray detectors disposed vertically in said housing, a source of neutrons mounted substantially midway between said detectors and capable of bombarding the hole walls to liberate gamma rays therefrom, means between said source and said detector for shielding said detectors from direct gamma radiation from said source, shield means surrounding the vertical sides of each detector, said last named means comprising a layer of material of high density and high atomic number of sufficient thickness to absorb gamma rays from said source scattered in the walls of the hole and sufficiently thin to permit the passage therethrough to said detectors of said liberated gamma rays, and means for recording the sum of the outputs of said detectors and the individual outputs of each detector.

GERHARD HERZOG.

REFERENCES CITED

The following references are of record in the file of this patent:

UNITED STATES PATENTS

| Number | Name | Date |
| --- | --- | --- |
| 2,275,748 | Fearon | Mar. 10, 1942 |
| 2,285,840 | Scherbatskoy | June 9, 1942 |
| 2,289,926 | Neufeld | July 14, 1942 |
| 2,296,176 | Neufeld | Sept. 15, 1942 |
| 2,303,688 | Fearon | Dec. 1, 1942 |
| 2,345,119 | Hare | Mar. 28, 1944 |
| 2,349,712 | Fearon | May 23, 1944 |
| 2,353,619 | Pontecorvo | July 11, 1944 |

OTHER REFERENCES

Compton, X-Rays and Electrons, D. Van Nostrand Co., 1926, pp. 6–9, 184 and 185. (Copy in Div. 54.)